United States Patent
Van Nieuwenhove et al.

(10) Patent No.: US 8,648,998 B2
(45) Date of Patent: Feb. 11, 2014

(54) TOF RANGE FINDING WITH BACKGROUND RADIATION SUPPRESSION

(75) Inventors: Daniel Van Nieuwenhove, Hofstade (BE); Ward Van Der Tempel, Muizen (BE); Maarten Kuijk, Antwerp (BE)

(73) Assignee: Softkinetic Sensors NV, Brussels (BE)

( * ) Notice: Subject to any disclaimer, the term of this patent is extended or adjusted under 35 U.S.C. 154(b) by 421 days.

(21) Appl. No.: 12/991,744

(22) PCT Filed: May 11, 2009

(86) PCT No.: PCT/EP2009/055671
§ 371 (c)(1),
(2), (4) Date: Nov. 9, 2010

(87) PCT Pub. No.: WO2009/135952
PCT Pub. Date: Nov. 12, 2009

(65) Prior Publication Data
US 2011/0058153 A1    Mar. 10, 2011

(30) Foreign Application Priority Data
May 9, 2008    (EP) .................................... 08156033

(51) Int. Cl.
*G01C 3/08*    (2006.01)
(52) U.S. Cl.
USPC ......................................... 356/5.01; 356/4.01
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS 6,130,713 A    10/2000    Merrill
6,285,164 B1    9/2001    Noda et al.
(Continued)

FOREIGN PATENT DOCUMENTS

JP    2006-523074 A    10/2006
JP    2007-121116 A    5/2007
(Continued)

OTHER PUBLICATIONS

First Office Action from the State Intellectual Property Office of the People's Republic of China (SIPO) in Chinese Patent Application 200980122237.4, mailed Sep. 13, 2012 (71 pages).
International Search Report in PCT/EP2009/055671, Feb. 8, 2010.
Invitation to Pay Additional Fees (Partial Search Report) in PCT/EP2009/055671, May 11, 2009.
(Continued)

*Primary Examiner* — Luke Ratcliffe
(74) *Attorney, Agent, or Firm* — Bacon & Thomas, PLLC

(57) ABSTRACT

A method for measuring time of flight of radiation includes emitting modulated radiation (51) in response to a first modulation signal, projecting the modulated radiation (51) onto a scene (55), and receiving radiation, the received radiation including at least modulated radiation reflected by the scene (55). The received radiation (26, 27) is converted into a radiation induced electrical signal. The radiation induced electrical signal is mixed with a second modulation signal, thus generating a mixed signal, which is integrated, thus generating an integrated signal. When the integrated signal exceeds a threshold value ($V_{ref}$), charge is injected into the integrated signal. The method includes applying changes to the first and/or second modulation signal at one or more moments in time, and measuring the integrated signal at one or more moments in time, thus obtaining at least one TOF pair difference signal (62). The measuring includes using a single detector node (38) and associated memory element (25), to obtain a TOF pair difference signal (62). The method furthermore includes using one or more TOF pair difference signals to determine time of flight of radiation.

24 Claims, 10 Drawing Sheets

(56) References Cited

U.S. PATENT DOCUMENTS

| | | | |
|---|---|---|---|
| 6,678,039 | B2 | 1/2004 | Charbon |
| 6,919,549 | B2 | 7/2005 | Bamji et al. |
| 7,157,685 | B2 | 1/2007 | Bamji et al. |
| 7,176,438 | B2 | 2/2007 | Bamji et al. |
| 7,268,858 | B2 | 9/2007 | Kuijk et al. |
| 2002/0176067 | A1 | 11/2002 | Charbon |
| 2005/0051707 | A1 | 3/2005 | Bamji et al. |
| 2006/0000967 | A1* | 1/2006 | Kuijk et al. .............. 250/221 |
| 2006/0027730 | A1 | 2/2006 | Bamji et al. |
| 2006/0157643 | A1* | 7/2006 | Bamji et al. ............ 250/208.1 |

FOREIGN PATENT DOCUMENTS

| | | |
|---|---|---|
| JP | 2008-089346 A | 4/2008 |
| WO | 2006/086455 A2 | 8/2006 |

OTHER PUBLICATIONS

Written Opinion of the International Searching Authority in PCT/EP2009/055671, Feb. 8, 2010.

International Preliminary Report on Patentability in PCT/EP2009/055671, Sep. 21, 2010.

Second Office Action from the State Intellectual Property Office of the People's Republic of China (SIPO) in Chinese Patent Application 200980122237.4, mailed Feb. 20, 2013.

Communication of EPO regarding European Application No. 09 742 170.5-2220, Apr. 19, 2011.

Office Action dated Jun. 4, 2013 issued in corresponding Japanese application No. 2011-507941.

Office Action dated Sep. 5, 2013 issued in corresponding Chinese application No. 2009 80122237.4.

* cited by examiner

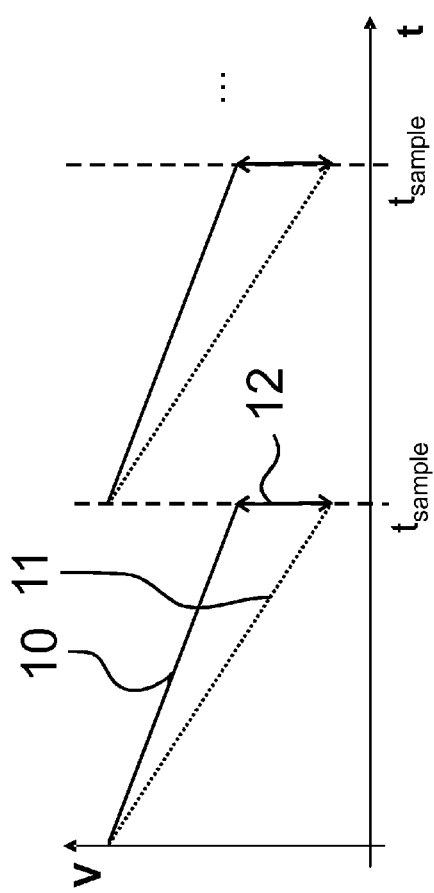
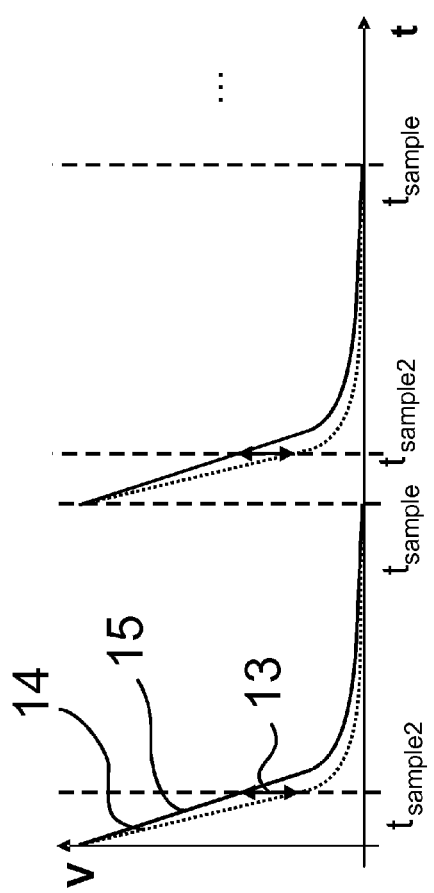

TOF RANGE FINDING WITH BACKGROUND RADIATION SUPPRESSION

TECHNICAL FIELD OF THE INVENTION

The present invention relates to the field of distance measuring sensors and methods for time-of-flight (TOF) measurements. More particularly the present invention relates to such devices and methods adapted to achieve efficient background radiation handling, in particular to achieve efficient background radiation suppression, at variable background radiation conditions. The radiation may be visible or infrared light.

BACKGROUND OF THE INVENTION

The basic principle of using time-of-flight (TOF) measurements for range finding applications is to measure how long it takes for radiation, e.g. photons to travel over an unknown distance. The unknown distance can then be deduced from the measured time of flight in combination with the known speed of the radiation such as light.

Many ways of how to modulate a light source for such TOF measurements, and which strategy to follow for making the distance measurement are known to a person skilled in the art and are described in patents and scientific literature. Most of these range-finding systems use a receiver in which a mixer is used to demodulate an incoming photocurrent for finding e.g. a phase or a time period for distance estimation. The photocurrent is typically mixed with a reference signal.

A problem is to separate signals originating from background light efficiently from signals originating from useful TOF-light. The useful TOF-light may be emanating from a modulated light source. The background light that is present on an area in a scene, of which the distance is to be measured, can be a plurality of orders of magnitude larger, e.g. up to six orders of magnitude larger, than the light present on this same area and originating from the modulated light source. It is known from literature how to reduce this large difference to some extent by using an optical filter, which attenuates the visible background light from the TOF light based on wavelength differences. In this way a reduction of an order of magnitude can be obtained. With a narrow-band optical pass filter and using a narrow-band laser light source for generating the useful TOF-light, possibly two orders of magnitude can be overcome. However, LED light sources are preferred light sources for future TOF range finders, since there brightness may be much higher; they may emit Watts of light, whereas lasers may only emit milli-Watts of light in free space for eye-safety reasons.

In U.S. Pat. No. 7,268,858 a device is described to measure TOF signals in the presence of large background light signals. This is done using transistors to continuously compensate for the extra drawn background light current. Therefore this solution adds transistor noise to the circuit, thus degrading the signal to noise ratio and distance accuracy.

A better signal to noise ratio is obtained by accumulating the charges on a capacitance for a specified time interval, then sampling the capacitor value and resetting it for a subsequent measurement. This is a well known technique used in standard imaging, e.g. in active pixels; it will be referred to hereinafter as capacitance integration. Major drawback of the approach is the limited upper end dynamic range due to saturation of the capacitor. Capacitance integration has been reused in TOF imaging to similarly optimize signal to noise ratio, but unfortunately, due to this limited upper end dynamic range for both useful and background light, rapidly fails in the presence of background light. This is illustrated in FIG. 2A and FIG. 2B. FIG. 2A shows exemplary transient output signals of a typical prior art time-of-flight sensor, implementing capacitance integration. In these sensors mixing is typically carried out asymmetrically by multiplying to 1 and 0, not to 1 and −1. Therefore background light translates to a signal that contributes equally to both output signals 10 and 11. The TOF useful signal is contained in the difference 12. When, as shown in FIG. 2B, a larger background light component is present, the output signals, 14 and 15, saturate to ground before being sampled at $t_{sample}$ and lose the needed difference information. A straight forward way to solve this is shortening the integration interval or sampling the signal earlier, for example at $t_{sample2}$. This, however, results in a smaller measured difference amplitude 13 and in a smaller signal-to-noise ratio.

For use in standard imaging, techniques have been developed to stretch the limited upper end dynamic range of these capacitance integrating circuits. In FIG. 1A a general schematic of such a circuit is shown, as discussed in e.g. U.S. Pat. No. 6,130,713. Inside each pixel an automatic reset circuit 100 and a counter 4 are provided. A comparator 3 of the automatic reset circuit 100 triggers reset transistor 1 whenever a predefined threshold value $V_{ref}$ is passed, resetting detector node 2 and shifting the voltage over reset voltage 5 (see FIG. 1B) so that integration is restarted. The counter 4 counts the total number of resets N taking place during one integration period. In FIG. 1B the voltage evolution 6 on detector node 2 is shown. At the end of the integration time, at moment $t_{sample}$, output value 8 is obtained together with the number N of resets. The total intensity value is found by multiplying counter output N with reset voltage 5 and adding the sampled output value 8. If the added reset noise (noise generated by the reset transistor 1) is ignored the dynamic range is in this way extended N times.

This technique, implementing capacitance integration with a dynamic range extension circuit has also been reused in time of flight detector read-out circuits, for example in U.S. Pat. No. 6,919,549 and U.S. Pat. No. 7,157,685, resulting in the same extension of the dynamic range and thus, up to some degree, in an increased tolerance to background light. However, since in these techniques the amount of needed circuitry scales with the achieved dynamic range extension, for obtaining reasonable background light suppression a very large substrate area, e.g. silicon area, is needed.

Other dedicated, but more complex, time-of-flight techniques extending dynamic range and thus tolerating background light up to some degree exist, like for example the techniques claimed in U.S. Pat. No. 7,176,438 or in U.S. Pat. No. 6,678,039.

Therefore, though many techniques exist in the field, there is still room for improvement.

SUMMARY OF THE INVENTION

It is an object of embodiments of the present invention to provide good apparatus or methods for performing TOF measurements.

The above objective is accomplished by a method and device according to the present invention.

In a first aspect, the present invention provides a method for measuring time of flight of radiation. The method comprises emitting modulated radiation in response to a first modulation signal, projecting the modulated radiation onto a scene, and receiving radiation, the received radiation comprising at least modulated radiation reflected by the scene. The received radiation is converted into a radiation induced electrical signal. The radiation induced electrical signal is mixed with a second modulation signal, thus generating a mixed signal, which is integrated, thus generating an integrated signal. In accordance to embodiments of the present invention, the mixing may take place in the charge, voltage or current domain. When the integrated signal exceeds a threshold value, charge is injected into the integrated signal. The method comprises applying changes to the first and/or second modulation signal at one or more moments in time, and measuring the integrated signal at one or more moments in time, thus obtaining at least one TOF pair difference signal. The measuring includes using a single detector node and associated memory element, e.g. capacitor, to obtain a TOF pair difference signal. Different detector nodes and associated memory elements may be provided, but do not need to be provided, to obtain different TOF pair difference signals. The method furthermore comprises using one or more TOF pair difference signals to determine time of flight of radiation, for example by taking the arctangent of the ratio of two TOF pair difference signals.

In a method according to embodiments of the present invention, the mixed signal may be integrated on an integrating capacitor and may have a polarity sign. Obtaining a TOF pair difference signal may include changing the polarity sign of the integrated signal by changing polarity of the integrating capacitor synchronised with the moments in time at which changes to the first and/or second modulation signal are applied. This way, in-pixel subtraction of TOF pair signals is performed.

A method according to embodiments of the present invention may furthermore comprise using a data reconstruction step for translating TOF pair difference signals into useful TOF output data. The data reconstruction step may comprise subtracting a value substantially equal to one or more times a voltage corresponding to the amplitude of the injected charge from the highest signal of the TOF pair or adding a value substantially equal to one or more times a voltage corresponding to the amplitude of the injected charge to the lowest signal of the TOF pair before making the difference whenever for a TOF pair a difference between the signals of the pair larger than half of the value substantially equal to one or more times the voltage corresponding to the amplitude of the injected charge from the highest signal of the TOF pair is obtained. A corrected difference signal is thus obtained. Using one or more TOF pair difference signals to determine time of flight of radiation may then comprise using one or more corrected difference signals.

In a method according to embodiments of the present invention, determining time of flight of radiation may comprise calculating difference signals between signals forming a TOF pair taken at first and second moments in time, respectively. In alternative embodiments, the difference signal may be generated in-pixel.

A method according to embodiments of the present invention may furthermore comprise keeping a relative position of the number of charge injections by determining whether a same amount of charge injections have taken place inside a TOF pair between measurement of the integrated signal at a first moment in time and measurement thereof at a second moment in time. This may for example be performed by means of a two-state memory. Alternatively, keeping a relative position of the number of charge injections may be performed by determining the relative difference in charge injections inside a TOF pair between measurement of the integrated signal at a first moment in time and measurement thereof at a second moment in time. This may be performed by means of a counter.

This way, noise robustness is extended.

Keeping the relative position of the number of charge injections may be performed while cycling several times over a limited number of states.

In accordance with embodiments of the present invention, the number of times the voltage corresponding to the amplitude of the injected charge is added to the lowest signal or subtracted from the highest signal of the TOF pair, may be defined by the number of states present in a relative position memory used for keeping the relative position of the number of charge injections. In embodiments of the present invention, such relative position memory may comprise a periodical counter, and twos complement may be used for in pixel subtraction of the counter value so that only one measurement of the counter value is necessary instead of two.

The method may furthermore comprise performing a validity check on an output or the outputs providing the measured integrated signal or on an output or the outputs providing the signals forming a TOF pair. Performing a validity check may comprise keeping a relative position of the number of charge injection of two signals of a TOF pair. Keeping a relative position of the number of charge injections may comprise determining whether a same amount of charge injections have taken place for the two signals of the TOF pair up to the sampling moment.

In a method according to embodiments of the present invention, the second modulation signal may comprise substantially the same modulation as the first modulation signal, but time-shifted.

In a method according to embodiments of the present invention, injecting charge into the integrated signal may comprise determining when the integrated signal exceeds said threshold value, and injecting the charge when the integrated signal exceeds said threshold value.

The received radiation may comprise a first portion being the modulated radiation reflected by the scene and a second portion being background radiation.

In a second aspect, the present invention provides the use of a method according to any of the embodiments of the first aspect for a distance measurement.

In a third aspect, the present invention provides a device for measuring time of flight of radiation. The device comprises a radiation emitting source, a modulating device for modulating, in response to a first modulation signal, radiation emitted by the radiation emitting source, a radiation receiver for receiving radiation, the received radiation comprising at least modulated radiation reflected by a scene, and conversion means for converting received radiation into a radiation induced electrical signal. The device furthermore comprises mixing means for mixing said radiation induced electrical signal with a second modulation signal, thus generating a mixed signal. Modulation signal alteration means, for example selector means, are provided to change the first and/or second modulation signal at moments in time. Integration means are provided for integrating the mixed signal, thus generating an integrated signal. A charge injection circuit is provided to add charge to the integrated signal when it exceeds a threshold value. The device further comprises at least one single detector node and associated memory element for obtaining a TOF pair difference signal from the integrated signal, and a signal processing system adapted for determining time of flight radiation using one or more TOF pair difference signals.

It is characteristic for embodiments of the present invention that a single detector node is provided per TOF pair. One or more TOF pairs are used for determining the time of flight radiation. Each of these TOF pairs can be, but do not need to be, measured on separate detector nodes.

The received radiation may comprise modulated radiation reflected by a scene and background radiation.

The memory element may have a switchable polarity sign.

The signal processing system may comprise data reconstruction logic for translating TOF pair difference signals into useful TOF output data.

The signal processing system, e.g. the data reconstruction logic, may be adapted for subtracting a value substantially equal to one or more times a voltage corresponding to the amplitude of the added charge from the highest signal of the TOF pair, and/or for adding a value substantially equal to one or more times a voltage corresponding to the amplitude of the added charge to the lowest signal of the TOF pair before making the difference whenever for a TOF pair a difference between the signals of the pair larger than half of the value substantially equal to one or more times the voltage corresponding to the amplitude of the added charge is obtained. The signal processing system may thus be adapted for providing a corrected difference signal. The signal processing system may furthermore be adapted for determining time of flight of radiation using such corrected difference signal.

In embodiments of the present invention, the signal processing system may comprise Delay Locked Loop (DLL) circuitry. TOF pair difference signals are generated to determine an error signal that can be used in the loop of the DLL. The DLL's converged output will then be substantially proportionate to the desired time-of-flight delay.

The integrated signal may comprise at least one signal from at least one TOF pair. The device may furthermore comprise a relative position memory adapted for determining for signals of a TOF pair whether a same amount of charge injections have taken place between measurement of the integrated signals at a first moment in time and measurement thereof at a second moment in time. Alternatively, the device may comprise a relative position memory adapted for determining for signals of a TOF pair the relative difference in number of charge injections between measurement of the integrated signal at a first moment in time and measurement thereof at a second moment in time. The relative position memory may comprise a periodical counter that is adapted to cycle its total number of states several times while still keeping track of the difference in number of states.

The relative position memory may comprise a counter using twos complement.

The conversion means may comprise a photodetector for converting the received radiation into a radiation induced electrical signal.

The second modulation signal may comprise substantially the same modulation as the first modulation signal, but time-shifted.

The charge injection circuit may comprise a comparator for comparing the mixed signal with the threshold value, and a reset switch for resetting the integrated signal when it exceeds the threshold value.

In a further aspect, the present invention provides an in-pixel subtraction technique which may be used in determining TOF information. According to this aspect, the present invention provides a method for measuring time of flight of radiation. The method comprises emitting modulated radiation in response to a first modulation signal; projecting the modulated radiation onto a scene; receiving radiation, the received radiation comprising at least modulated radiation reflected by the scene; converting the received radiation into a radiation induced electrical signal; mixing the radiation induced electrical signal with a second modulation signal, thus generating a mixed signal; integrating the mixed signal on an integrating capacitor, thus generating an integrated signal, the integrated signal having a polarity sign; applying changes to the first and/or second modulation signal at one or more pre-determined moments in time; synchronised with these pre-determined moments in time changing the polarity sign of the integrated signal, by changing polarity of the integrating capacitor; measuring an end-value of the integrated signal to obtain a TOF pair difference signal; and using one or more TOF pair difference signals to determine time of flight of radiation.

A method according to embodiments of the present invention may furthermore comprise injecting charge into the integrated signal when the integrated signal exceeds a threshold value.

In yet a further aspect, the present invention provides a transformation algorithm technique for use in determining TOF information. According to this aspect, the present invention provides a method for measuring time of flight of radiation. The method comprises emitting modulated radiation in response to a first modulation signal; projecting the modulated radiation onto a scene; receiving radiation, the received radiation comprising at least modulated radiation reflected by the scene; converting the received radiation into a radiation induced electrical signal; mixing the radiation induced electrical signal with a second modulation signal, thus generating a mixed signal; integrating the mixed signal, thus generating an integrated signal; injecting charge into the integrated signal when the integrated signal exceeds a threshold value; measuring the integrated signal at pre-determined moments in time to obtain a TOF pair difference signal; whenever for a TOF pair a difference between the signals of the pair larger than half of a value substantially equal to one or more times the voltage corresponding to the amplitude of the injected charge is obtained, subtracting the value substantially equal to one or more times the voltage corresponding to the amplitude of the injected charge from the highest signal of the TOF pair or adding a value substantially equal to one or more times the voltage corresponding to the amplitude of the injected charge to the lowest signal of the TOF pair before making the difference, thus obtaining a corrected difference signal, and using one or more corrected difference signals to determine time of flight of radiation.

It is an advantage of embodiments of the present invention that range finding methods and systems based on TOF measurements are improved compared to prior art methods and systems.

It is a further advantage of embodiments of the present invention that range finding methods and systems based on TOF measurements using small area circuits supporting 2D-arrays of rangefinders are provided, to thereby provide 3D-cameras for many applications.

It is an advantage of embodiments of the present invention that an integrating circuit with high background light attenuation is achieved keeping high signal to noise ratio and still achieving 3D camera operation.

It is a further advantage of embodiments of the present invention that this is possibly combined in a small circuit.

Embodiments of the present invention may show one or more, but not necessarily all, of the above advantages. Some embodiments may have all of the above advantages.

Particular and preferred aspects of the invention are set out in the accompanying independent and dependent claims. Features from the dependent claims may be combined with features of the independent claims and with features of other dependent claims as appropriate and not merely as explicitly set out in the claims.

Accordingly, the present invention provides, in particular a method for measuring time of flight of radiation, the method comprising emitting modulated radiation in response to a first modulation signal, projecting the modulated radiation onto a scene, receiving radiation, the received radiation comprising at least modulated radiation reflected by the scene, converting the received radiation into a radiation induced electrical signal, mixing the radiation induced electrical signal with a second modulation signal, thus generating a mixed signal, integrating the mixed signal, thus generating an integrated signal, injecting charge into the integrated signal when the integrated signal exceeds a threshold value, applying changes to the first and/or second modulation signal at one or more moments in time, measuring the integrated signal at one or more moments in time, thus obtaining at least one TOF pair difference signal, the measuring including using a single detector node and associated capacitor, to obtain a TOF pair difference signal, obtaining a corrected TOF pair difference signal by subtracting a value substantially equal to one or more times a voltage corresponding to the amplitude of the injected charge from the TOF pair difference whenever this difference is larger than half of the value substantially equal to one or more times the voltage corresponding to the amplitude of the injected charge and adding a value substantially equal to one or more times a voltage corresponding to the amplitude of the injected charge to the TOF pair difference whenever this difference is lower than minus half of the value substantially equal to one or more times the voltage corresponding to the amplitude of the injected charge, and using one or more corrected TOF pair difference signals to determine time of flight of radiation.

The present invention also provides a device for measuring time of flight of radiation, comprising a radiation emitting source, a modulating device for modulating, in response to a first modulation signal, radiation emitted by the radiation emitting source, a radiation receiver for receiving radiation, the received radiation comprising at least modulated radiation reflected by a scene, conversion means for converting received radiation into a radiation induced electrical signal, mixing means for mixing said radiation induced electrical signal with a second modulation signal, thus generating a mixed signal, modulation signal alteration means to change the first and/or second modulation signal at moments in time, a capacitor for integrating the mixed signal, thus generating an integrated signal, a charge injection circuit to add charge to the integrated signal when it exceeds a threshold value, at least one single detector node and associated capacitor for obtaining a TOF pair difference signal from its integrated signal, and a signal processing system, wherein there is an adaptation to the signal processing system providing a corrected TOF pair difference signal by subtracting a value substantially equal to one or more times a voltage corresponding to the amplitude of the added charge from the TOF pair difference signal whenever for a TOF pair a difference between the signals of the pair larger than half of the value substantially equal to one or more times the voltage corresponding to the amplitude of the added charge is obtained and adding a value substantially equal to one or more times a voltage corresponding to the amplitude of the added charge to the TOF pair difference signal whenever for a TOF pair a difference between the signals of the pair smaller than minus half of the value substantially equal to one or more times the voltage corresponding to the amplitude of the added charge is obtained, for determining time of flight of radiation using one or more corrected TOF pair difference signals.

The present invention also provides a method for measuring time of flight of radiation, the method comprising emitting modulated radiation in response to a first modulation signal, projecting the modulated radiation onto a scene, receiving radiation, the received radiation comprising at least modulated radiation reflected by the scene, converting the received radiation into a radiation induced electrical signal, mixing the radiation induced electrical signal with a second modulation signal, thus generating a mixed signal, integrating the mixed signal, thus generating an integrated signal, injecting charge into the integrated signal when the integrated signal exceeds a threshold value, applying changes to the first and/or second modulation signal at one or more moments in time, measuring the integrated signal at one or more moments in time, thus obtaining at least one TOF pair difference signal, the measuring including using a single detector node and associated capacitor, to obtain a TOF pair difference signal, obtaining a corrected TOF pair difference signal by carrying out in-pixel subtraction, by changing the polarity of the integration means and/or twos complementing bits in a relative position memory (60, 78, 100), synchronised with the one or more moments in time at which the either first or second modulation signal changes, and using one or more corrected TOF pair difference signals to determine time of flight of radiation.

The present invention also provides a device for measuring time of flight of radiation, comprising a radiation emitting source, a modulating device for modulating, in response to a first modulation signal, radiation emitted by the radiation emitting source, a radiation receiver for receiving radiation, the received radiation comprising at least modulated radiation reflected by a scene, conversion means for converting received radiation into a radiation induced electrical signal, mixing means for mixing said radiation induced electrical signal with a second modulation signal, thus generating a mixed signal, modulation signal alteration means to change the first and/or second modulation signal at moments in time, a capacitor for integrating the mixed signal, thus generating an integrated signal, a charge injection circuit to add charge to the integrated signal when it exceeds a threshold value, at least one single detector node and associated capacitor for obtaining a TOF pair difference signal from the integrated signal, and a signal processing system adapted for providing a corrected TOF pair difference signal using in-pixel subtraction incorporating a capacitor adapted for switching polarity and/or a relative position memory adapted for twos complementing bits, and this synchronized with the change to the first and/or second modulation signal at moments in time, for determining time of flight of radiation using one or more corrected TOF pair difference signals.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 2A and FIG. 2B show output signals of a prior art TOF sensor for different background light intensities.

Figure 1A:
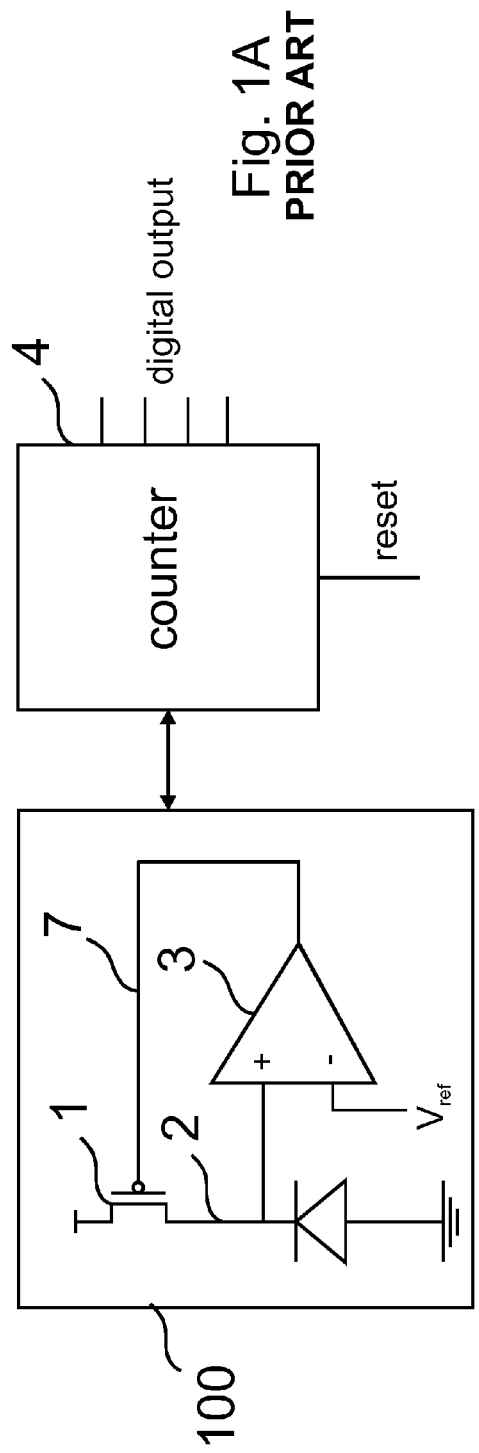
FIG. 1A shows a prior art standard image sensor having large dynamic range.
Figure 1B:
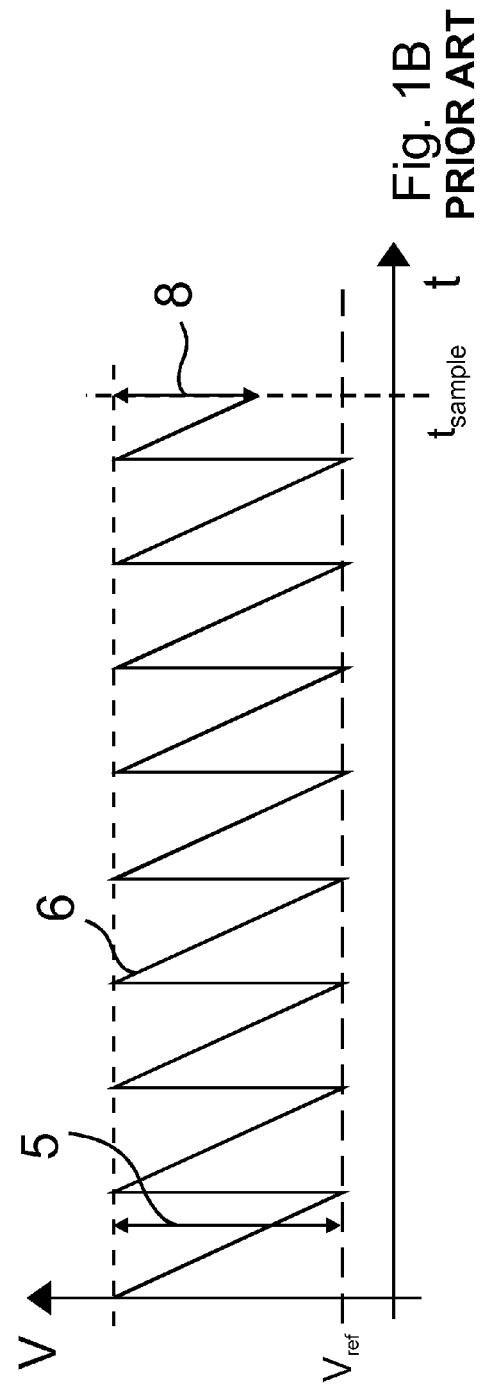
FIG. 1B shows an output signal of the sensor schematically illustrated in FIG. 1A.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions as illustrated do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the description and the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. Dependent claims of any of the claim categories can be combined with independent claims of any of the claim categories as appropriate.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

With "time of flight (TOF) measurement" is meant a measurement method used to measure the time that it takes for radiation, e.g. visible or infrared light, to reach a detector while travelling over an unknown distance at a known speed.

With "TOF pair" is meant a group of 2 signals, in embodiments of the present invention optionally acquired sequentially in time, containing all or part of the TOF data needed to determine TOF of radiation.

With "TOF pair difference" is meant the difference between the signals in a TOF pair also taking into account the difference between the associated output values of a relative position memory (if present) multiplied by a reset voltage.

With "reset voltage" is meant the voltage corresponding to the amplitude of an injected charge.

With "relative position of the number of charge injections" is meant the difference in number of times a charge injection has taken place.

The invention will now be described by a detailed description of several embodiments of the invention. It is clear that other embodiments of the invention can be configured according to the knowledge of persons skilled in the art without departing from the technical teaching of the invention as defined by the terms of the appended claims.

Reference will be made to transistors. These are three-terminal devices having a first main electrode such as a drain, a second main electrode such as a source and a control electrode such as a gate for controlling the flow of electrical charges between the first and second main electrodes. It will be clear for a person skilled in the art that the present invention is also applicable to similar devices that can be configured in any transistor technology, including for example, but not limited thereto, CMOS, BICMOS, Bipolar and SiGe BICMOS technology.

Furthermore the findings of the present invention are explained with reference to PMOS and NMOS transistors as an example, but the present invention includes within its scope a complementary device whereby PMOS and NMOS transistors become NMOS and PMOS transistors, respectively. A skilled person can make such modifications without departing from the teaching of the invention as defined by the appended claims.

Time-of-flight (TOF) measurements typically rely on mixing detected reflections of radiation with phase shifted versions of the original radiation. These can be for example 0°, 180°, 90° and 270° phase shifted. By calculating the phase information I=0°-180° and Q=90°-270°, the distance information can be found in the inverse tangent of I/Q.

Instead of modulating by means of phases of a clock signal, a person skilled in the art can also consider transmitting a pseudo-random bit stream and mixing with a set of delayed and/or inverted same pseudo random bit streams. The use of pseudo-random bit streams, sometimes referred to as pseudo-noise, is known in literature by a person skilled in the art.

A common factor for all TOF measurement techniques, whether pseudo random noise based, multi-sine based, square wave based or other, is that always is relied on the difference of signal pairs, like in the definitions of I and Q in the above-mentioned example. In the rest of this document signal pairs of this kind will be referred to as TOF pairs.

The number of TOF pairs used to obtain the time of flight can differ, but at least one is needed. An example of a pixel needing only one TOF pair to obtain the TOF, not illustrated in the drawings, is a pixel where the signal processing system comprises Delay Locked Loop (DLL) circuitry, known by a person skilled in the art. In such a pixel a single TOF pair suffices to obtain an error signal that can be used in the loop of the DLL. The DLL's converged output will then be substantially proportionate to the wanted time-of-flight delay.

The subtraction performed to obtain the useful difference signal of a TOF pair can be performed on various levels. This can be done on a computer or microprocessor, in an FPGA, in extra circuitry on-chip or even, as will be discussed later on in this document, in-pixel.

Figure 3:
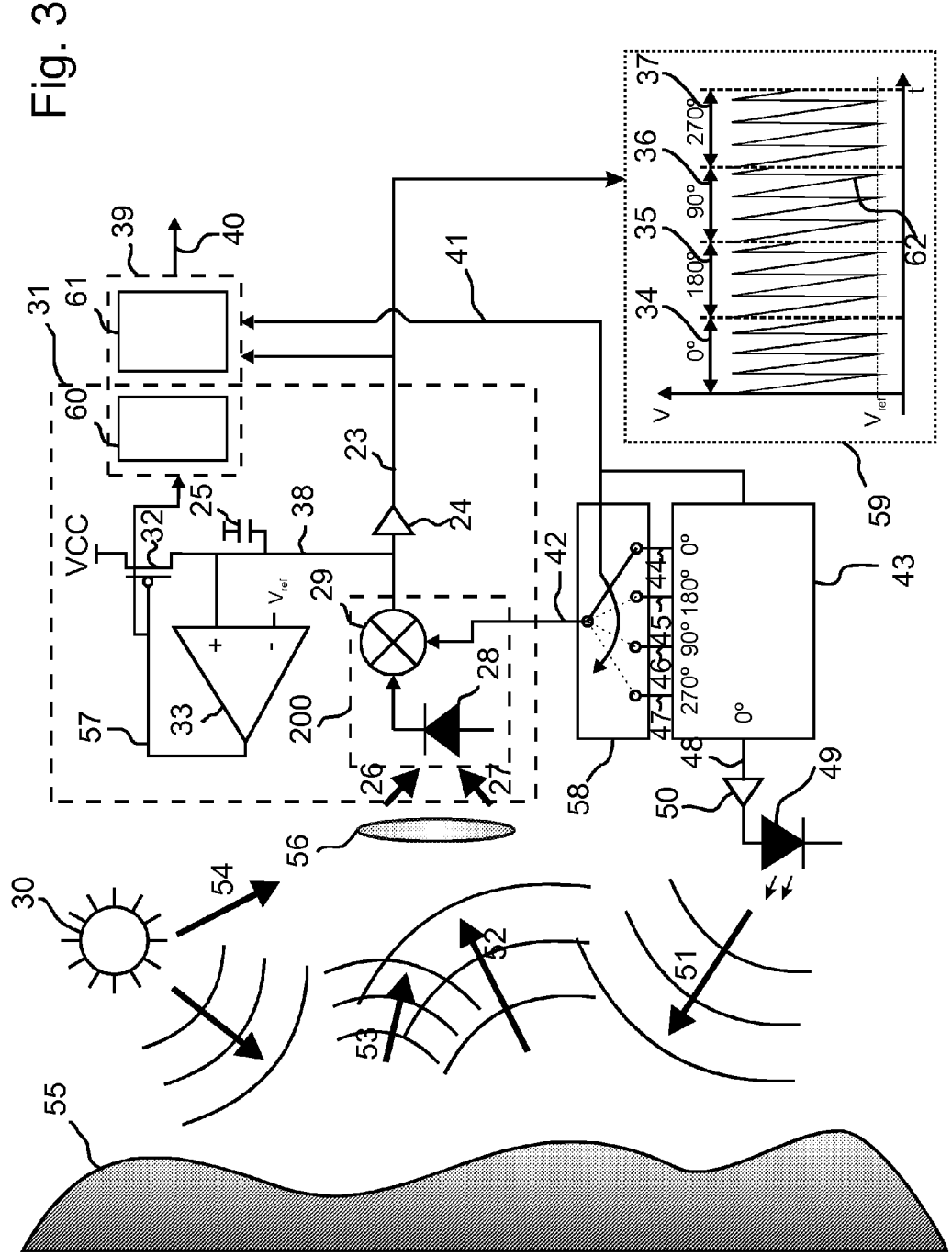
FIG. 3 schematically shows an implementation of a TOF sensor according to an embodiment of the present invention.

FIG. 3 shows a first embodiment of a range finding system according to the present invention. The range finding system comprises a light source 49 for emitting light 51 onto a scene 55, preferably focussed onto an area of interest, where the light is reflected. The range finding system further comprises at least one pixel 31 for receiving reflected light. In order for the light source 49 to emit modulated light, a signal generator 43 is provided. The signal generator 43 generates a first clock signal or modulation signal on node 48 that is preferably permanently oscillating at a predetermined frequency, e.g. at about 10 MHz. This signal generator 43 also generates second to fifth clock signals which are delivered onto nodes 44, 45, 46, 47, respectively, having a 0°, 180°, 90° and 270° phase relation with the first clock signal on node 48. A person skilled in the art can also consider using other or more clock phases in the operation scheme, more clock phases leading towards better measurement precision in exchange for a longer measurement time. Alternatively, instead of modulating by means of phases of a clock signal, a person skilled in the art can also consider transmitting a pseudo-random bit stream and mixing with a set of delayed and/or inverted same pseudo random bit streams. The use of pseudo-random bit streams, sometimes referred to as pseudo-noise is known in literature by a person skilled in the art. In that case, instead of the first and second clock signals it is advised to use a pseudo-random pattern, instead of the third clock signal use the same pseudo-random pattern but bitwise inverted and instead of the fourth clock signal, the same pseudo random pattern but delayed by a bit period and instead of the fifth clock signal, the same pseudo-random pattern but inverted and delayed by a bit period.

The signal generator 43 also generates a control signal 41 that is determining for a modulation signal alteration means to change the modulation signal, e.g. a control signal 41 that is determining for a selector 58 to select between the second to fifth clock signals, i.e. between the different phases of the clock signal. Selector 58 is switching sequentially between these four phases connecting the input node 42 of a mixer 29 of a detector and mixer stage 200 with the second to fifth clock signals on nodes 44, 45, 46 and 47 sequentially. At each of these positions selector 58 can stay connected for a relaxation period of e.g. about 1 ms.

Buffer 50 drives the light source 49 that emits its light 51 onto the scene 55, preferably focused on the area of interest. Part of this light will be reflected, thus generating reflected light 52. This reflected light 52 then arrives on an optical focussing system such as a lens 56, through which it is imaged or focussed on a detector 28 inside pixel 31, where the incident fraction is called the reflected modulated light (ML) 27.

Indirect light 53 and direct light 54, both originating from secondary light sources 30 not intended for the TOF measurement, will also be present in the scene, impinge on the optical focussing system 56 and thus be focused on the detector 28.

The part of this light entering detector 28 will be called background light (BL) 26. Light sources 30 generating BL include incandescent lamps, TL-lamps, sunlight, daylight, or whatever other light that is present on the scene and does not emanate from the light source 49 for TOF measurement. An aim of the present invention is to obtain valid TOF measurements even in the presence of the signal from BL 26.

ML 27 and BL 26 impinge onto the photodetector 28, and generate, respectively, an ML-current and a BL-current, which are photo-induced current responses to the impinging BL 26 and ML 27. Detector 28 outputs these currents to a subsequent mixing means, e.g. mixer 29, for mixing the current responses to the impinging BL 26 and ML 27 with the phase-shifted clock signal on input node 42. As already stated earlier, this BL 26 can induce a BL-current of up to 6 orders of magnitude higher than the ML-current induced by the ML 27 received for TOF measurements.

Detector 28 and mixer 29, forming detector and mixer stage 200, can as well be implemented as one single device, for example as described in EP1513202A1, where the photo-generated charges are mixed generating the mixing product current at once.

The detector and mixer stage 200 will generate the mixing products of the current responses to the impinging BL 26 and ML 27 with phase-shifted clock signals, and these signals are being integrated on node 38 by means of an integrator, for example implemented with a capacitor 25, which preferably is kept small, e.g. the parasitic capacitance of the surrounding transistors. During integration, an automatic reset of the mixer output signal on the integrator node 38 is performed.

This may for example be implemented by a comparator 33 triggering a reset switch, e.g. reset transistor 32, so that the mixer output signal on node 38 is automatically reset whenever it reaches a reference value Vref, thus avoiding saturation.

In alternative embodiments, not illustrated in the drawings, the automatic reset of the mixer output signal on the integrator node 38 can be implemented in several other ways. One of them is triggering a charge pump, instead of the reset switch 32, to add a fixed amount of charges to capacitor 25 yielding a better noise performance at the cost of some more complexity.

The mixing products forming the mixer output signal are available in a sequential form synchronised with the modulation signal alteration means, in the example illustrated selector 58, at integrator node 38. An output driver 24, e.g. a buffer, provides a voltage gain substantially 1 and current amplification so as to provide a stronger output signal at output node 23.

In graph 59 an example of an output signal at node 23 is represented. Curve 62 corresponds to the voltage evolution versus time of the output signal at output node 23. It is supposed that the average BL contribution 26 and average ML 27 is constant during acquisition.

During a first relaxation period 34, selector 58 is connected to node 44. The mixing of the incoming signal from the detector 28 (responses to BL 26 and ML 27) is done with the second clock signal at node 44, which is a 0° shifted version of the first clock signal driving the light source 49. The mixer output signal at node 38 will thus be determined by a BL component and a 0° mixed ML output. The next relaxation period 35 starts by connection of input node 42 to node 45 through selector 58. From then on, the mixer 29 is driven 180° out of phase. Therefore its output will be determined by the same BL component and a 180° mixed output. The phases 90° and 270° are subsequently treated similarly in subsequent relaxation periods 36 and 37 respectively.

Time-of-flight data reconstruction block 39 uses the output signal at output node 23 to measure, e.g. by taking samples, the end values of each relaxation period 34, 35, 36, 37, also called phase interval. This data is grouped to TOF pairs, e.g. (0°, 180°) and (90°, 270°). TOF data reconstruction block 39 serves to translate the bare pixel signals to useful time-of-flight output 40.

As explained later in this document, this sometimes includes a transformation step and/or validation step. In embodiments of the present invention this reconstruction block may be built up of two possible parts: a relative position memory 60 which in embodiments of the present invention may be an in-pixel relative position memory 60 and a processing block 61 which in embodiments of the present invention may be an off-pixel signal processing block 61. The signal processing block 61 may be realised in any suitable way, for example in-pixel, on-chip, in a microprocessor, a DSP, in an FPGA, at software level and can even be distributed and spread over various levels, e.g. partly on-chip, partly in an FPGA and partly at software level on a PC, depending on the application.

Measuring the TOF data sequentially is needed for signals within one TOF pair. When using more than one TOF pair these different TOF pairs can be measured in parallel using two pixels 31, in some cases even sharing partly mixer 29, detector 28 or both. In the embodiment shown in FIG. 3, the TOF pair emanating from signals 46 and 47 can for example be implemented in such an extra circuit, allowing parallel acquisition of both TOF pairs and gaining more robustness to fast background and modulated light changes, at the cost of extra silicon area. Doubling part or whole of the embodiment to acquire other TOF data in parallel might further also require the subsequent post processing blocks to compensate for the mismatch that can exist between the different circuits.

Figure 4:
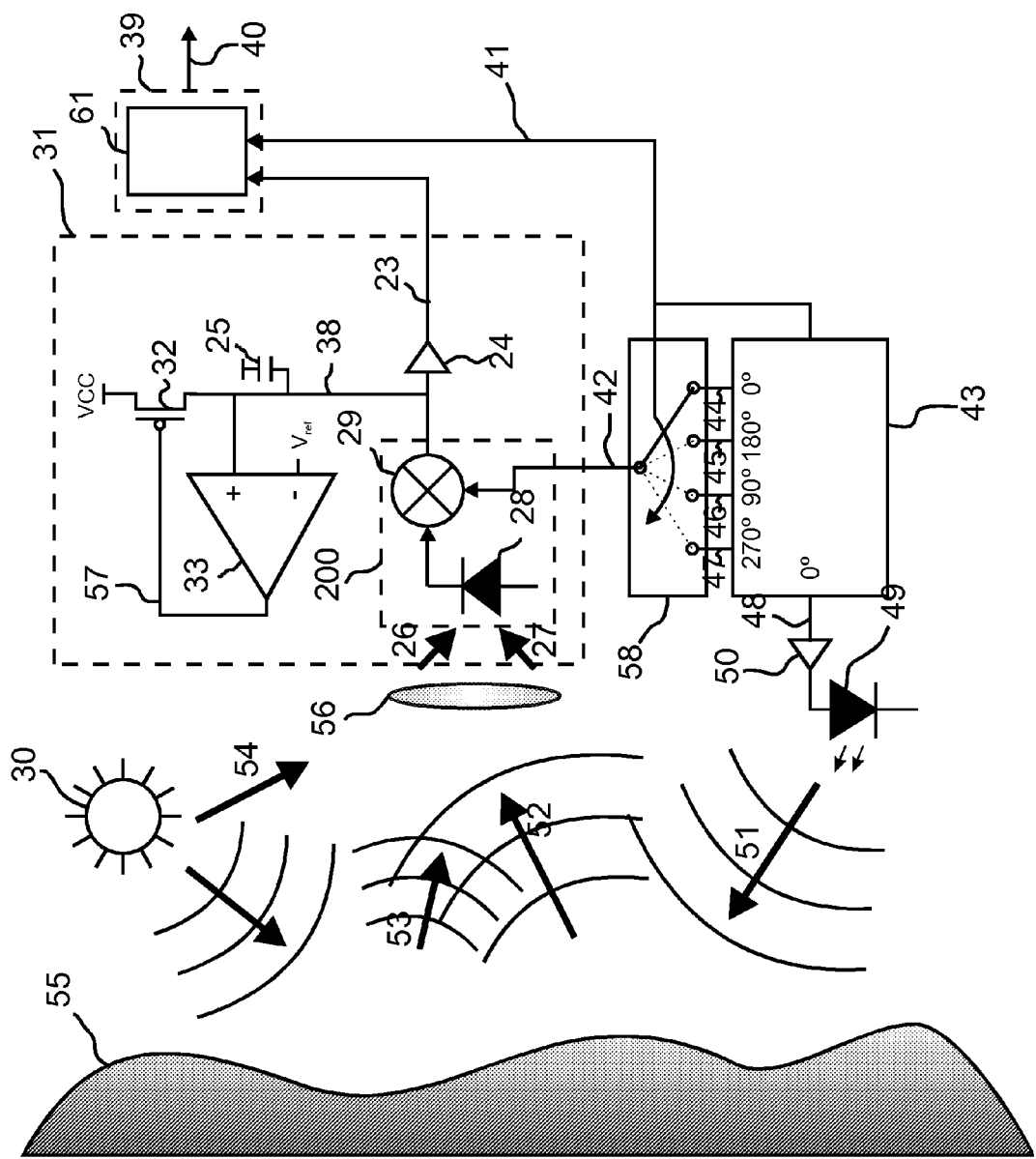
FIG. 4 schematically shows an implementation of a TOF sensor according to an embodiment of the present invention, not using a relative position memory.

In FIG. 4 an alternative embodiment of the present invention is shown, using only a signal post processing block 61 in the time-of-flight data reconstruction block 39. When assuming that each of the phases or relaxation periods 34, 35, 36, 37 has seen an equal number of automatic resets when sampled, the wanted measure for phase delay due to light's TOF is obtained by dividing the difference between the measurements obtained at the end of relaxation periods 34 and 35 by the difference obtained at the end of relaxation periods 36 and 37, and taking the arctangent. It is further assumed that the slow varying BL signal 26 contributes equally to the four relaxation periods, so that it is cancelled by the automatic reset and valid TOF data remains measurable, even in the presence of a large BL signal. Therefore, according to embodiments of the present invention, the TOF info is directly found from the calculations on outputs at the end of relaxation periods. This technique will be referred to as the equal reset technique.

However, this technique can only be used in case an equal number of resets take place during the plurality of relaxation periods, what can never be assured, as it is dependent on the amount of light which impinges on photodetector 28.

Figure 5:
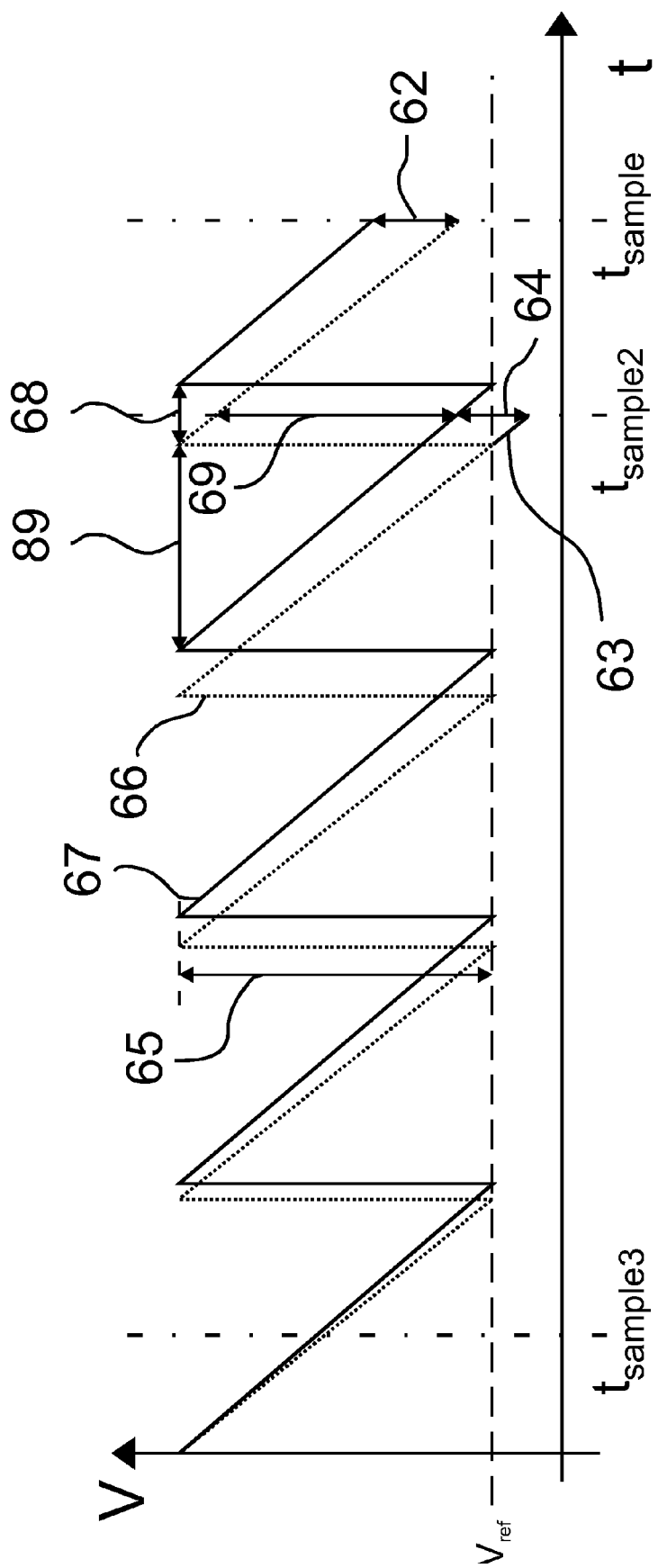
FIG. 5 shows output signals of the implementation illustrated in FIG. 4.

In FIG. 5, signals 66 and 67 are signals of a TOF pair, measured time sequentially but drawn on the same graph for illustration purposes. It can be seen that when sampling at the end of a first sampling period, e.g. at moment $t_{sample}$, the equal reset technique will output the correct difference value 62 for the TOF pair. When, however, the signal is sampled at the end of a second sampling period, e.g. at moment $t_{sample2}$, both signals 66 and 67 have undergone a different number of resets and hence the obtained difference signal 69 is wrong, resulting in an erroneous TOF calculation. Therefore, depending on the length of the sampling period, the obtained difference signal may be right or wrong.

It can further be seen in FIG. 5 that the length of interval 68, marking the time where the number of resets for the first and the second output signals 66, 67 are different, in relation to the length of a second interval 89, marking the time where the number of resets for the first and the second output signals 66, 67 are equal, is proportional to the amplitude of the TOF pair difference signal. Therefore, if the calculated difference signal 62 of the TOF pair is small with respect to reset voltage 65, chances for an equal number of resets during both relevant relaxation periods and valid TOF pair measurement are high.

To assure a valid output, next to the sampling and grouping of TOF pairs as described above, an output data validity test could be implemented in signal post processing block 61 to identify erroneous TOF measurements and replace these, e.g. with the last known good measurement or a mean value of the surrounding valid pixels. An example of a validity test is checking the mean value for 0° and 180° is substantially equal to that of 90° and 270°.

Adding more certainty to the correctness of the output values can be done using another embodiment of the present invention carrying out the TOF pair subtraction within the pixel. This may be done by implementing a capacitor that can switch polarity and thus switch the sign of the integration. When using such a capacitor, if the polarity is switched when changing the modulation going from the first signal in the TOF pair to the second signal in the TOF pair, at the end of the second integration a measure for the TOF pair difference can be measured, e.g. by sampling. An advantage of the technique is that since subtraction is already carried out in the pixel only one measurement has to be taken to obtain the difference of one time of flight pair instead of two measurements.

Figure 10:
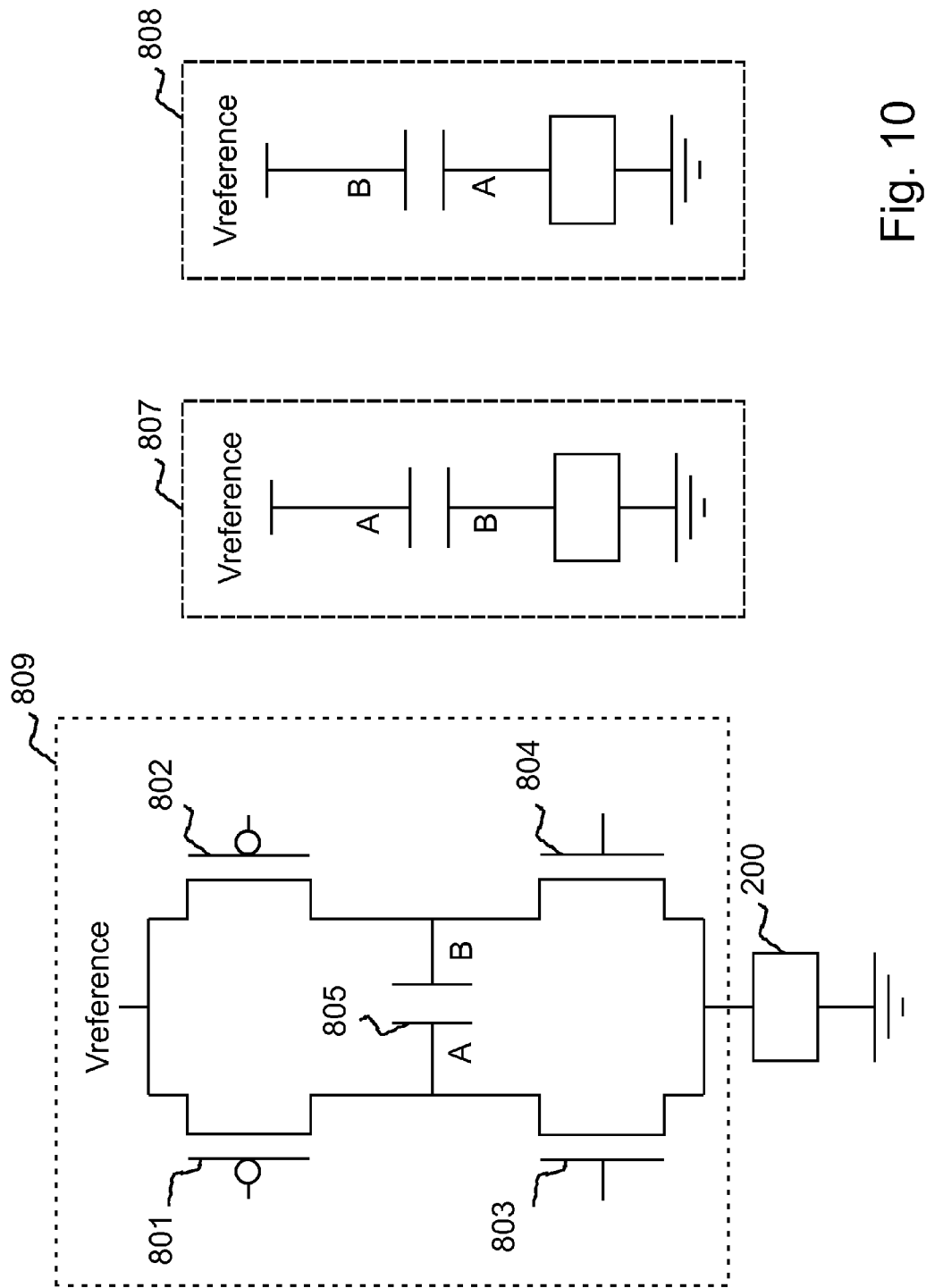
FIG. 10 shows a capacitance integration circuit allowing for change of polarity of the integrating capacitor.

An example of such a polarity switchable capacitor circuit 809 is shown in FIG. 10. It comprises a bridge comprising two parallel legs with each two series transistors 801, 803-802, 804 which may in embodiments of the present invention be coupled in parallel between a reference voltage Vreference and the mixer output of detector and mixer stage 200. The transistors 801, 803-802, 804 serve as switches to determine the polarity of a voltage over capacitor 805, coupled between the legs of the bridge, in relation to Vreference and detector and mixer stage 200. When PMOS transistor 801 and NMOS transistor 804 are closed, i.e. conductive, and PMOS transistor 802 and NMOS transistor 803 are open, i.e. non-conductive, capacitor 805 is connected as shown in FIG. 10 indicated by reference number 807. Closing PMOS transistor 802 and NMOS transistor 803, while leaving PMOS transistor 801 and NMOS transistor 804 open, i.e. non-conductive, capacitor 805 is connected as shown in FIG. 10 indicated by reference number 808. The signals to the control electrodes, e.g. gates, of the transistors 801, 802, 803 and 804 are controlled so that the transistors can be made conductive or non-conductive as required for operation as explained. Since the charge on capacitor 805 is substantially maintained when switching from one situation to the other, the sign of the already accumulated charge is switched. The voltage Vreference is preferably chosen in the middle of the voltage range, since this allows for equal positive and negative integration range.

Drawback of using such in-pixel subtraction is that due to parasitic capacitances present in the circuit the subtraction is not perfect. Also the capacitor carrying out the subtraction, e.g. capacitor 805 used in switchable capacitor circuit 809, is typically larger than capacitor 25 used in the embodiment illustrated in FIG. 4. This requires more silicon area and results in a worse signal to noise ratio. However in many case this drawback is of less importance than the resulting improvement. This technique will be referred to as the in-pixel subtraction technique. Further the technique will still fail if the TOF pair difference signal to be measured exceeds half of reset voltage 65.

Another technique, according to embodiments of the present invention, improves the equal reset technique by implementing a transformation algorithm on the outputs, which may be performed in signal processing block 61. This transformation can at first be formulated as: whenever a TOF pair difference is larger than half of reset voltage 65, reset voltage 65 is subtracted, when this signal is lower than minus half of reset voltage 65, reset voltage 65 is added, so that a corrected difference value is obtained. In FIG. 5 this is shown: at $t_{sample2}$ the measured TOF pair difference 69 is larger than half of reset voltage 65 therefore reset voltage 65 is subtracted from curve 66 resulting in curve 63 and the correct TOF difference value 64. It is so that this transformation only works when the TOF pair difference signal to be measured is smaller than half of reset voltage 65. Further also the amplitude of reset voltage 65 will have to be known. A person skilled in the art can think of several ways how to measure reset voltage 65, either once during calibration or repeatedly at run-time, either using a photo-induced current, either using an internally generated current. As in the previous techniques, measuring the TOF remains possible in the presence of large background light signals. An advantage is that, if the difference signal remains within the constraints, there is no more uncertainty on the validity of the measurement, even in the presence of high background light components, while still a small capacitance 25 is used gaining higher signal to noise ratio. This technique will be referred to as the transformation algorithm technique.

All the former mentioned embodiments of the present invention allow for theoretically unlimited BL suppression. However, when background light signals become so high that the proportionately induced shot noise amplitude reaches or exceeds the difference amplitude constraints of the mentioned techniques, operation still fails. These constraints then become the limit on the amount of background light successfully suppressible by the system. Also averaging, highly desirable in such high noise situations because this compensates for the reduced signal to noise ratio, becomes impossible or very doubtful. A calculation of the shot noise amplitude of a background light signal of 1 kW/m$^2$ comes to 1.58V (using a typical system with following specific parameters: refresh rate=25 fps, lens aperture=1 cm detector area in scene=1 dm$^2$, photo-responsivity=0.4 A/W, detector capacitance=10 fF, object reflectivity=0.8). This is of the same order of magnitude as reset voltage 65, for which a typical value is 1V, and thus this noise will corrupt the outputted TOF pair difference due to the difference in resets between both TOF pair signals or due to a wrong transformation, in case of the transformation algorithm technique. Since it is an aim of the present invention to also be able to handle the above described background light situation, in particular embodiments, more is provided in order to enable the system to handle these higher background light signals and their induced noise.

This can be achieved according to embodiments of the present invention by adding relative position memory module 60. This module uses circuitry, comprising e.g. transistors, flipflops, invertors, capacitors, etc., to memorize the relative number of resets between the signals in TOF signal pairs. Using this module the constraint is stretched and can be reformulated as: the TOF pair difference signal amplitude has to remain below half of reset voltage 65 times the number of states of the relative position memory module in order for the resulting TOF information to be correctable as explained below.

Figure 6:
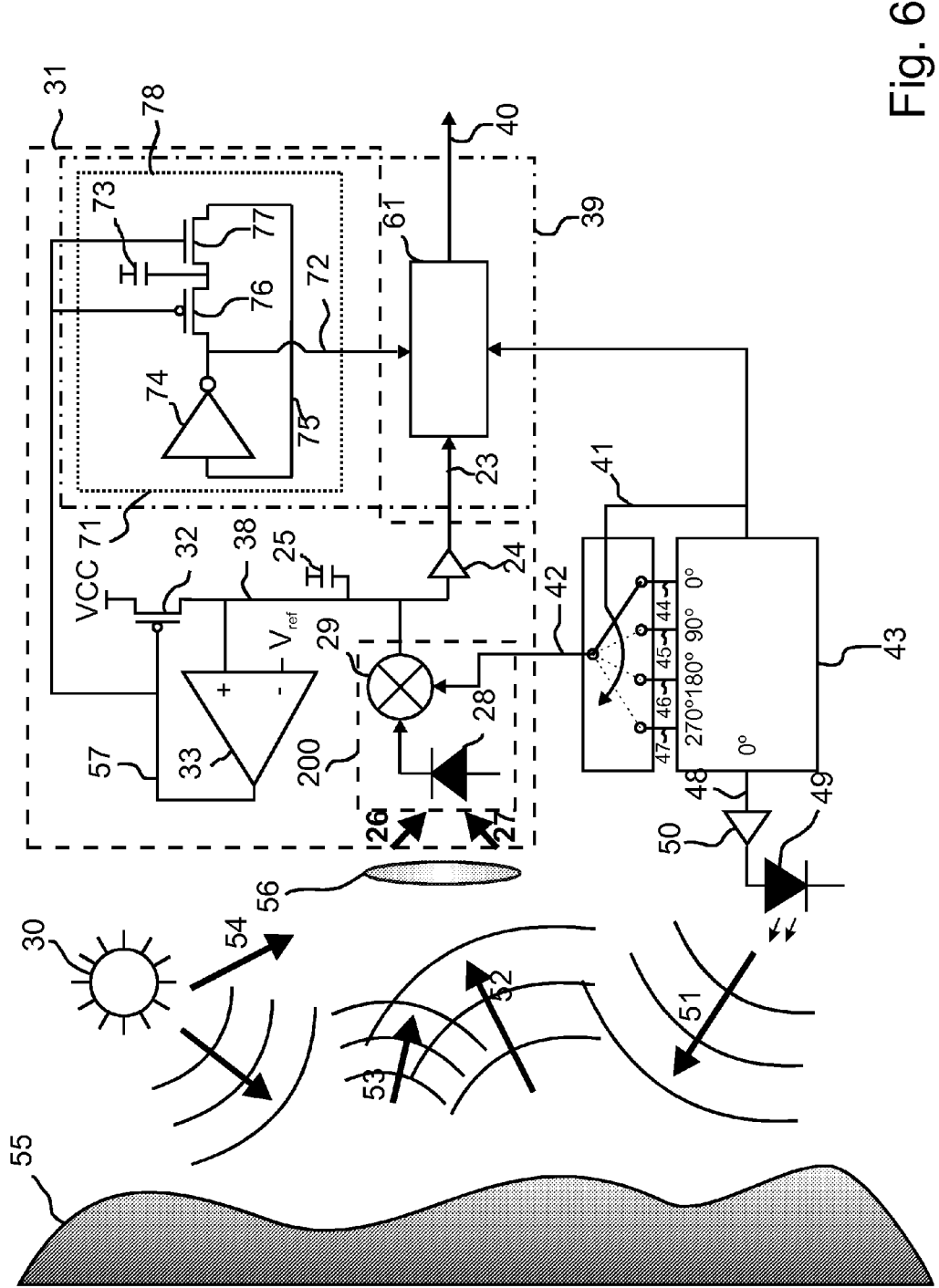
FIG. 6 schematically shows an implementation of a TOF sensor according to an embodiment of the present invention, with a 2-state relative position memory.
Figure 7:
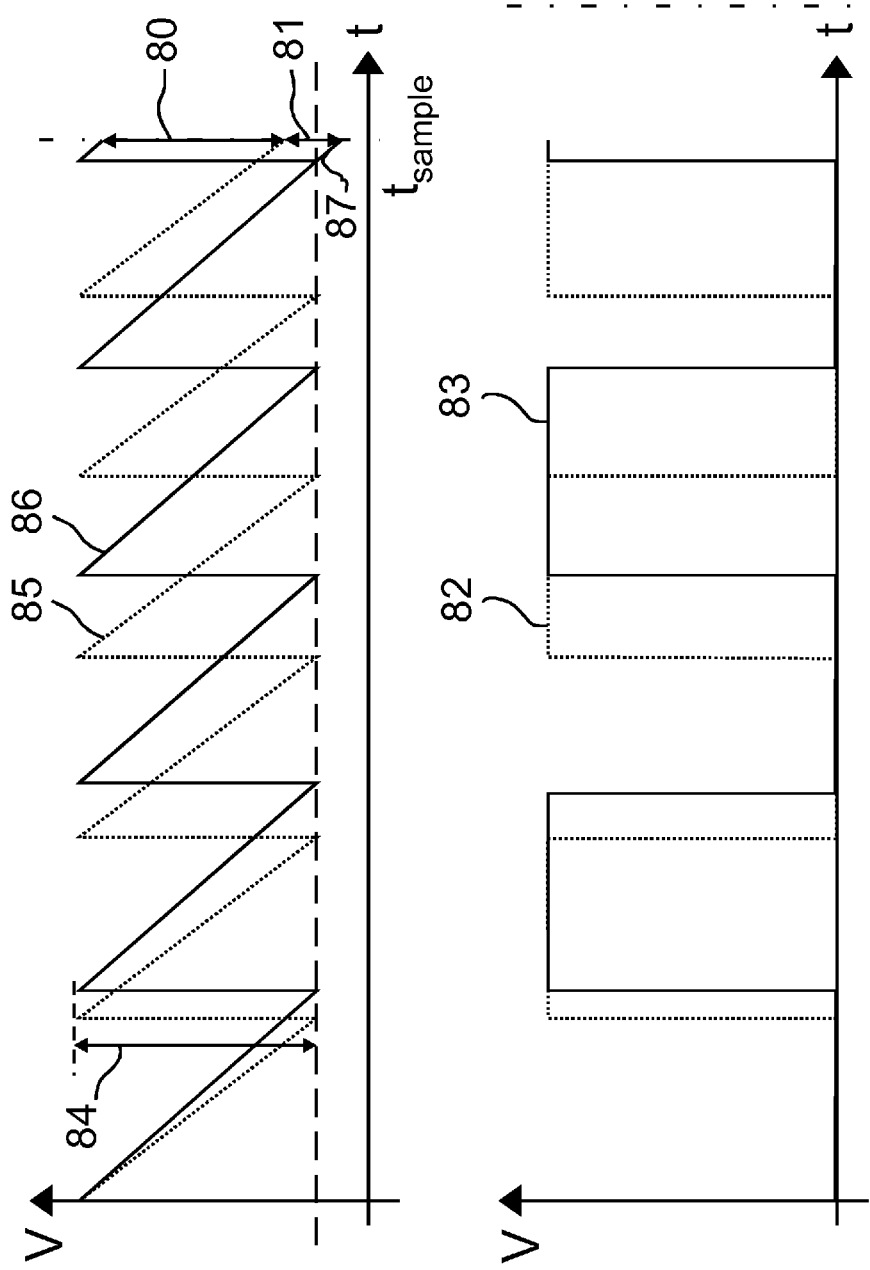
FIG. 7 shows output signals of the implementation illustrated in FIG. 6.

A first example of a relative position memory module having 2 states is illustrated in FIG. 6 as box 78. When comparator 33 pulses a low voltage on its output node 57 to reset the integrator means, e.g. capacitor 25, a first switch 76, e.g. PMOS transistor 76, is made conductive and passes the output of an invertor 74 to a memory element 73, e.g. capacitor 73. When the output node 57 of the comparator 33 returns to its high state, the first switch 76 is made non-conductive and a second switch 77, e.g. NMOS transistor 77, is made conductive and conducts the signal stored on the memory element 73 to the input 75 of the invertor 74, making it switch state. The next automatic reset, the invertor 74 will switch state again. The transient output signals generated by this implementation are shown in FIG. 7. Signals 85 and 86 are signals of a TOF pair, measured time sequentially but drawn on the same graph for illustration purposes. Signals 82 and 83 are corresponding output curves of the invertor signal present at output node 72 of the invertor 74 of relative position memory 78, corresponding to respectively 85 and 86. It can be seen that the difference signal value 80 at sampling moment $t_{sample}$ is larger than half of reset voltage 84. Without bringing relative memory module curves 82 and 83 into account, the transformation algorithm technique would substitute output signal 86 with extended curve 87 resulting in difference signal 81, which will result in a wrong time-of-flight measurement. Curves 82 and 83, giving information about the relative number of resets having taken place up to moment $t_{sample}$, indicate that this number of resets is equal for both. With this information TOF reconstruction logic 39 will decide that no extension of the curve or subtraction of the reset voltage is necessary so that the correct difference signal 80 is outputted. This helps up to some extent, but still the difference signal to be measured, together with the noise, has to be kept lower than reset voltage 65. The constraint limit is thus being doubled in relation to the aforementioned embodiment. Considering the common reset voltage 65 of 1V this improved embodiment is still unable to handle the noise levels mentioned in the example.

Figure 8:
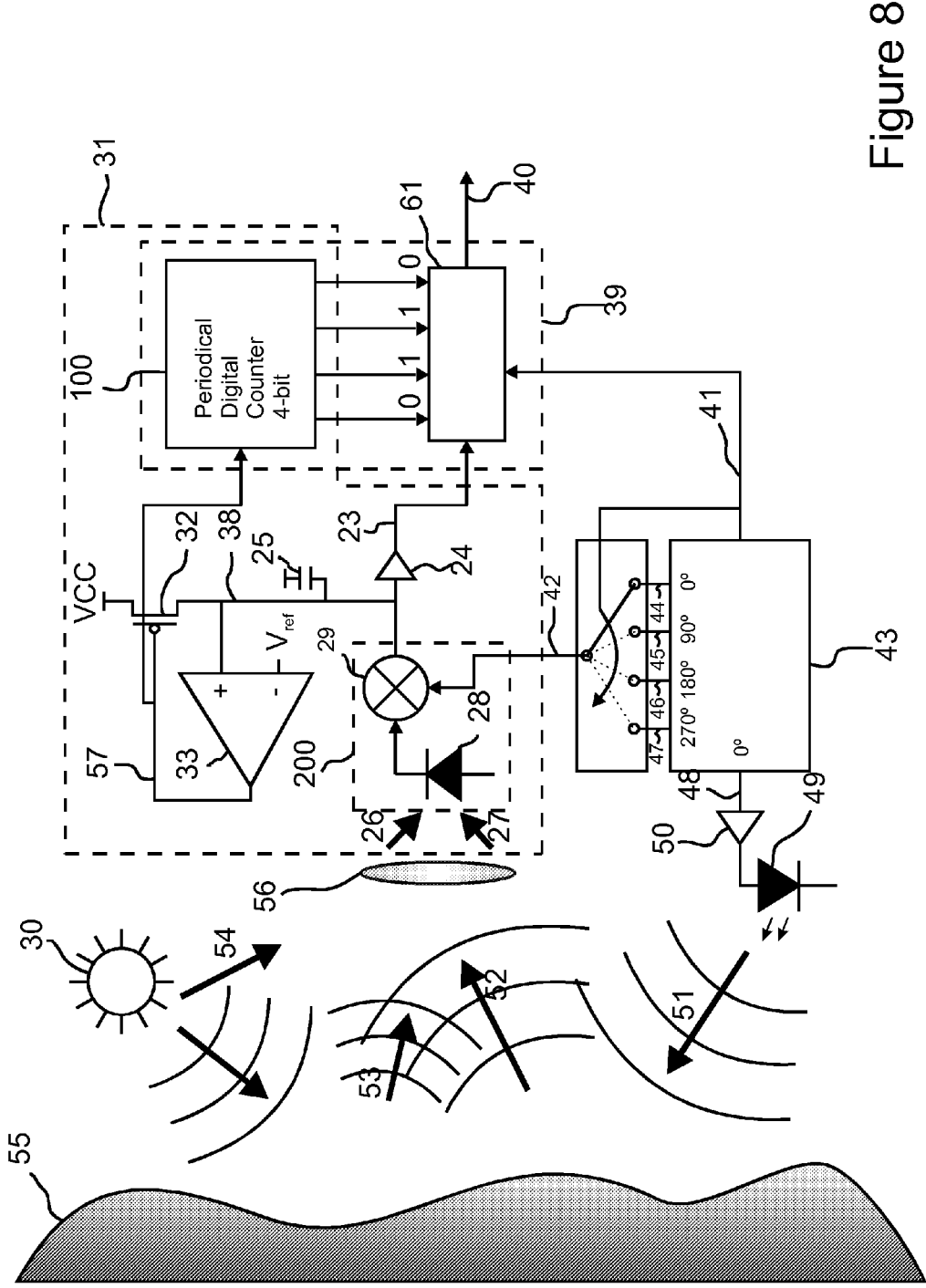
FIG. 8 shows another implementation using a relative position memory module with 16 states.

An implementation using a 16-state relative position memory module 100 is shown in FIG. 8. Here the relative position memory module is a 4-bit periodical digital counter, incremented every time the circuit auto resets. Because the counter is periodical, the relative number of resets between members in a TOF pair is maintained, even if a large BL signal 26 causes the counter to cycle its complete period several times. In this way the counter only keeps track of the relative difference in number of resets between the signals in the TOF pair and not of the BL signal which is assumed equal for the signals in the TOF pair. Therefore, using few bits already results in the wanted improvement thereby limiting the required substrate area for implementing such a counter. Using 16 states the constraint on the difference signal to be measured is increased to 8 times reset voltage 65. The transformation rule set of the transformation algorithm technique becomes: whenever the difference in a TOF pair is higher than 8 times reset voltage 65, 16 times reset voltage 65 has to be subtracted, when it is lower then minus 8 times reset voltage 65, 16 times reset voltage 65 has to be added. For example (reset voltage 65 is chosen 1 V): for a first measurement of a TOF pair the counter output gives 15 and the sampled value of output signal 23 shows a voltage drop of 0.2 V, a second measurement gives a counter output of 2 and a sampled output signal of 0.7 V. The sampled value added to the reset voltage multiplied by the counter output gives, for the first measurement 15*1 V+0.7 V=15.7 V, and for the second measurement 2*1 V+0.2 V=2.2 V. The difference 15.7 V−2.2 V=13.5 V is larger than 8 times the reset voltage 8*1 V; hence carrying out the transformation will result in the corrected TOF pair difference: 15.7 V−2.2 V−16*1 V=−2.5V this again in the assumption that the actual TOF pair signal amplitude is within its boundaries, as defined in the above constraint.

If a typical reset voltage of 1V is considered, with this 16-state memory module, the system can handle signal fluctuations up to 8 V. If the voltage noise of 1.58 V, as calculated before, is reconsidered for this embodiment it can be stated that this circuit is capable of handling and averaging the background light and its accompanying noise as specified in the example situation.

The above implementations of relative position memories are examples only. Other relative position memories with a different number of states can be used as well. A general rule is that whenever the difference in a TOF pair is higher than a pre-set number times the reset voltage, the pre-set number being equal to half the number of states of the relative position memory, more particularly in embodiments of the present invention the number of states of the counter of the relative position memory, the number of states of the memory times the reset voltage has to be subtracted, when it is lower than minus this pre-set number times the reset voltage, the number of states of the memory times the reset voltage has to be added. Further the measurement range of the real TOF pair difference is limited to this pre-set number multiplied by the reset voltage.

Further, also the in-pixel subtracting technique can benefit in the same way from the implementation of a relative position memory. Here also the constraint is multiplied by the number of states in the relative position memory.

In this technique, when using a periodical digital counter, it is preferred to implement twos compliment, well known in the prior art. Taking the twos complement of the counter causes the counter value to be reversed and reduced by 1. If, when reversing the capacitor value as explained above, also the counter value is twos complemented the counter value is reversed and reduced by 1 and will seemingly count backwards from then on so that in-pixel subtraction is realised for both the capacitor value and the counter value so that again only one measurement of the counter and capacitor value is necessary at the end of the measurement instead of two.

In embodiments of the present invention, combinations of the above techniques are possible, such as a circuit implementing only in-pixel subtraction for the capacitor value and not for the counter or vice versa, and can be thought of by a person skilled in the art.

Several other relative position memory modules can be thought of, such as 3-state fuzzy logic, linear feedback shift registers (LFSR), etc.

In the above examples it is assumed for the BL and useful light to remain constant over the sequentially measured signals. When this assumption is not valid, e.g. for fast variations of BL or ML, the techniques as explained above will not suffice for good TOF measurement. This is solved in accordance with embodiments of the present invention by placing in parallel several devices for measuring TOF of radiation according to embodiments of the present invention. For example when using 4 parallel embodiments of the present invention, the first measuring sequentially 0°, 90°, 180°, 270°, the second 90°, 180°, 270°, 0°, the third 180°, 270°, 0°, 90°, and the fourth 270°, 0°, 90°, 180° a person skilled in the art can think of several ways to exploit the extra information from these 4 measurements to achieve better immunity to fast BL and ML variations.

Depending on the target application a circuit with or without relative position memory module may be used. Embodiments without relative position memory module have the advantage that they use less silicon area and can handle a large BL signal, still limited due to the limited tolerance to BL induced noise. Embodiments with relative position memory modules use a larger silicon area and have the advantage that substantially all induced noise by the BL can be made tolerable, creating virtually unlimited BL tolerance.

Figure 9:
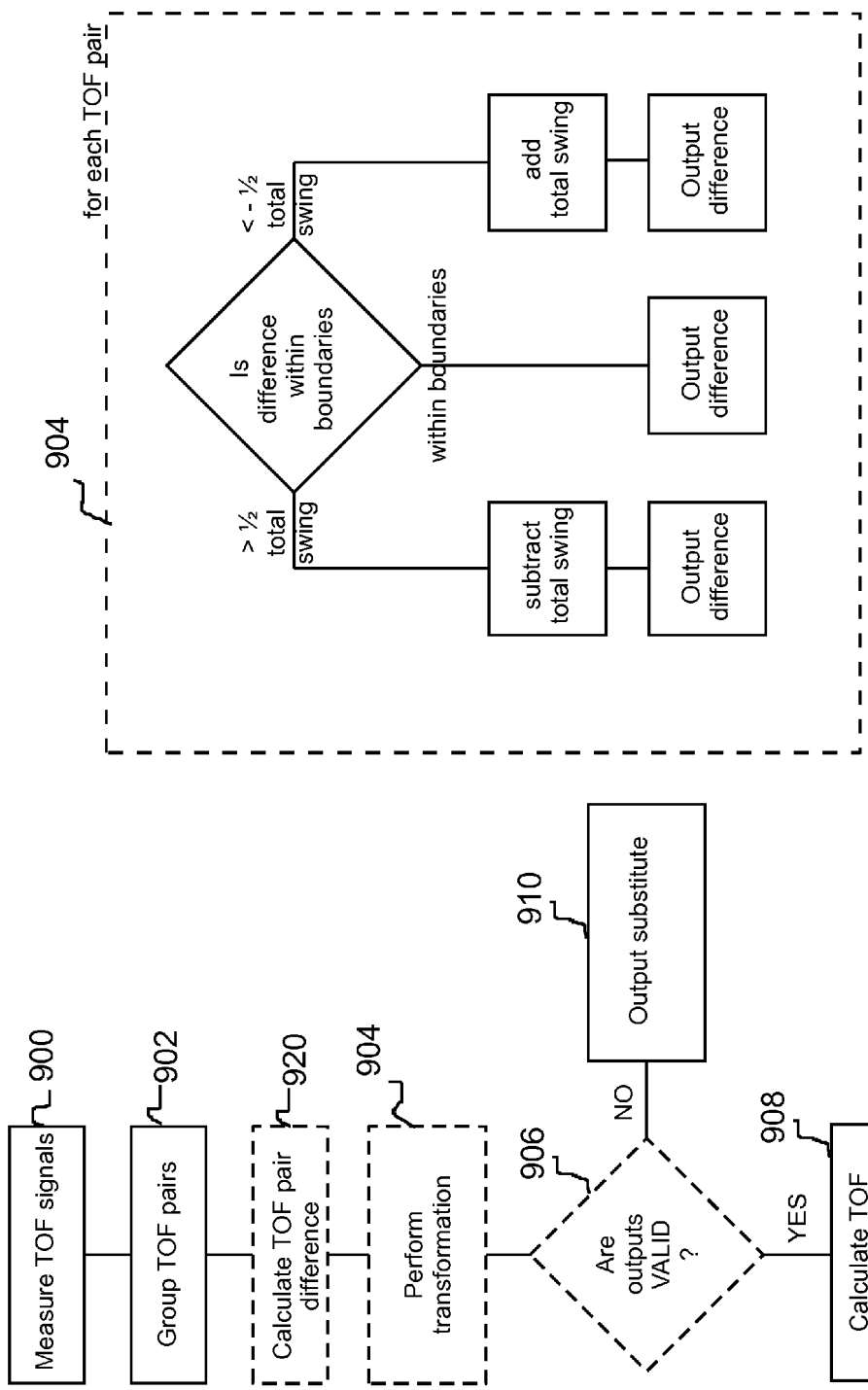
FIG. 9A is a general flow chart of the TOF processing block according to embodiments of the present invention.
FIG. 9B is a general flow chart of a TOF pair transformation as used in accordance with embodiments of the present invention.

In FIG. 9A a general flow chart of the TOF processing block 61 according to embodiments of the present invention is shown.

Although many other steps might be included in this processing block, the drawings and description are kept limited to blocks useful for explaining the invention. Other processing steps are known by people skilled in the art like for example averaging, filtering, performing, transformations, . . . .

A first step in the processing block is acquiring or measuring the TOF signals, this is done by e.g. sampling the output signal, followed by, if more than one TOF pair is used, the grouping 902 of the TOF pair signals. Further if not already done in-pixel, subtracting signals in each TOF pair to obtain the relevant TOF pair difference signal 920. In this subtraction the outputs of the relative position memory, if present, are taken into account as well. Next, optionally if so desired, a transformation 904 is performed for each of the TOF pairs when needed. After that a TOF data validity check 906 can optionally be done. If the validity check 906 indicates that the outputs are valid, TOF may be calculated and output, step 908, otherwise a substitute may be output, step 910, being for example an average of the surrounding pixels or a wrong measurement error signal.

In some configurations the processing block does not calculate directly the TOF, but moreover uses the processed data as an error signal in a loop, for example in a DLL, so that in this case many TOF pair difference signals are used to help the loop converge giving the distance.

In FIG. 9B a general flow chart of the transformation step 904 as used in the transformation algorithm technique is shown for one TOF pair. The total swing is defined by the total swing of analog output 23 and is, if a relative position memory is present, incremented by the number of states in this relative position memory multiplied by the reset voltage. A general formulation of the transformation is: when the measured difference in a TOF pair, taking into account the outputs of the possibly present relative position memory, is higher than half of the total swing, the total swing is subtracted, when it is lower than minus half of the total swing the total swing is added.

In a system using this transformation, to be correctly distinguishable, the difference signal to be measured has to be smaller than half of the total swing.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, in the embodiments illustrated, the light source 49 is driven by a clock signal and the detected radiation is mixed during different relaxation periods with a phase-shifted version of the clock signal. In alternative embodiments, the light source may be driven by a clock signal which is phase-shifted with regard to an original clock signal over different relaxation periods, while the detected signal is mixed with the original clock signal.

Furthermore, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for measuring time of flight of radiation, the method comprising:
    emitting modulated radiation in response to a first modulation signal,
    projecting the modulated radiation onto a scene,
    receiving radiation, the received radiation comprising at least modulated radiation reflected by the scene,
    converting the received radiation into a radiation induced electrical signal,
    mixing the radiation induced electrical signal with a second modulation signal, thus generating a mixed signal,
    integrating the mixed signal, thus generating an integrated signal,
    injecting charge into the integrated signal when the integrated signal exceeds a threshold value,
    applying changes to the first and/or second modulation signal at one or more moments in time,
    measuring the integrated signal at one or more moments in time, thus obtaining at least one TOF pair difference signal, the measuring including using a single detector node and associated capacitor, to obtain a TOF pair difference signal,
    obtaining a corrected TOF pair difference signal by subtracting a value substantially equal to one or more times a voltage corresponding to the amplitude of the injected charge from the TOF pair difference whenever this difference is larger than half of the value substantially equal to one or more times the voltage corresponding to the amplitude of the injected charge and adding a value substantially equal to one or more times a voltage corresponding to the amplitude of the injected charge to the TOF pair difference whenever this difference is lower than minus half of the value substantially equal to one or more times the voltage corresponding to the amplitude of the injected charge, and
    using one or more corrected TOF pair difference signals to determine time of flight of radiation.

2. The method according to claim 1, furthermore comprising determining whether for a TOF pair a same number of charge injections have taken place between measurement of the integrated signal at a first moment in time and measurement thereof at a second moment in time.

3. The method according to claim 1, furthermore comprising for a TOF pair, determining the difference in numbers of charge injections between measurement of the integrated signal at a first moment in time and measurement thereof at a second moment in time.

4. The method according to claim 1, wherein the value substantially equal to one or more times the voltage corresponding to the amplitude of the injected charge is equal to the number of states in a memory times said voltage.

5. The method according to claim 3, wherein the difference in numbers of charge injections is maintained while cycling several times over a limited number of states of a memory.

6. The method according to claim 1, furthermore comprising performing a validity check of the time-of-flight information in the corrected TOF pair signal or signals.

7. A device for measuring time of flight of radiation, comprising:
- a radiation emitting source,
- a modulating device for modulating, in response to a first modulation signal, radiation emitted by the radiation emitting source,
- a radiation receiver for receiving radiation, the received radiation comprising at least modulated radiation reflected by a scene,
- conversion means for converting received radiation into a radiation induced electrical signal,
- mixing means for mixing said radiation induced electrical signal with a second modulation signal, thus generating a mixed signal,
- modulation signal alteration means to change the first and/or second modulation signal at moments in time,
- a capacitor integrating the mixed signal, thus generating an integrated signal,
- a charge injection circuit that injects charge to the integrated signal when it exceeds a threshold value,
- at least one single detector node and associated capacitor that obtains a TOF pair difference signal from its integrated signal, and
- a signal processing system,
- wherein there is an adaptation to the signal processing system providing a corrected TOF pair difference signal by subtracting a value substantially equal to one or more times a voltage corresponding to the amplitude of the injected charge from the TOF pair difference signal whenever for a TOF pair a difference between the signals of the pair larger than half of the value substantially equal to one or more times the voltage corresponding to the amplitude of the injected charge is obtained and adding a value substantially equal to one or more times a voltage corresponding to the amplitude of the injected charge to the TOF pair difference signal whenever for a TOF pair a difference between the signals of the pair smaller than minus half of the value substantially equal to one or more times the voltage corresponding to the amplitude of the injected charge is obtained, and for determining time of flight of radiation using one or more corrected TOF pair difference signals.

8. A device according to claim 7, furthermore comprising a memory adapted for determining for signals of a TOF pair whether a same number of charge injections have taken place between measurement of the integrated signal at a first moment in time and measurement thereof at a second moment in time.

9. A device according to claim 7, furthermore comprising a memory adapted for determining for signals of a TOF pair the difference in number of charge injections between measurement of the integrated signal at a first moment in time and measurement thereof at a second moment in time.

10. A device according to claim 8, wherein the value substantially equal to one or more times the voltage corresponding to the amplitude of the injected charge is equal to the allocated number of states in the memory times said voltage.

11. A device according to claim 8, wherein the memory comprises a periodical counter.

12. A device according to claim 8, wherein the memory comprises a counter using twos complement.

13. A method for measuring time of flight of radiation, the method comprising:
- emitting modulated radiation in response to a first modulation signal,
- projecting the modulated radiation onto a scene,
- receiving radiation, the received radiation comprising at least modulated radiation reflected by the scene,
- converting the received radiation into a radiation induced electrical signal,
- mixing the radiation induced electrical signal with a second modulation signal, thus generating a mixed signal,
- integrating the mixed signal, thus generating an integrated signal, using a polarity switchable capacitor,
- injecting charge into the integrated signal when the integrated signal exceeds a threshold value,
- applying changes to the first and/or second modulation signal at one or more moments in time,
- measuring the integrated signal at one or more moments in time using a single detector node to obtain a TOF pair difference signal,
- and wherein the integrating comprises in-pixel subtraction of a TOF pair, by switching the polarity of the capacitor, synchronised with the one or more moments in time at which the either first or second modulation signal changes, and
- using one or more TOF pair difference signals to determine time of flight of radiation.

14. The method according to claim 13, furthermore comprising determining whether a same number of charge injections have taken place inside a TOF pair between measurement of the integrated signal at a first moment in time and measurement thereof at a second moment in time.

15. The method according to claim 13, furthermore comprising determining the difference in the number of charge injections between measurement of the integrated signal at a first moment in time and measurement thereof at a second moment in time.

16. The method according to claim 14, wherein determining the difference in the number of charge injections is maintained while cycling several times over a limited number of states of the memory.

17. The method according to claim 13, furthermore comprising performing a validity check on an output or outputs providing the measured integrated signal or signals forming a TOF pair.

18. The method according to claim 13, wherein only one measurement is taken to obtain the difference signal of a TOF pair.

19. A device for measuring time of flight of radiation, comprising
- a radiation emitting source,
- a modulating device modulating, in response to a first modulation signal, radiation emitted by the radiation emitting source,
- a radiation receiver for receiving radiation, the received radiation comprising at least modulated radiation reflected by a scene,
- conversion means for converting received radiation into a radiation induced electrical signal,
- mixing means for mixing said radiation induced electrical signal with a second modulation signal, thus generating a mixed signal,
- modulation signal alteration means for changing the first and/or second modulation signal at moments in time,
- an in-pixel capacitor integrating the mixed signal, thus generating an integrated signal,
- a charge injection circuit adding charge to the integrated signal when it exceeds a threshold value,
- one single detector node obtaining a TOF pair difference signal from the integrated signal, wherein the in-pixel capacitor is adapted for switching polarity synchronized with the change to the first and/or second modulation signal at moments in time, and a signal processing system for determining time of flight of radiation using one or more TOF pair difference signals.

20. The device according to claim 19, furthermore comprising a memory adapted for determining for signals of a TOF pair whether a same number of charge injections have taken place between measurement of the integrated signal at a first moment in time and measurement thereof at a second moment in time.

21. The device according to claim 19, furthermore comprising a memory adapted for determining for signals of a TOF pair the difference in number of charge injections between measurement of the integrated signal at a first moment in time and measurement thereof at a second moment in time.

22. The device according to claim 20, wherein the memory comprises a periodical counter.

23. The device according to claim 20, wherein the signal processing system is adapted for subtracting a value substantially equal to one or more times a voltage corresponding to the amplitude of the injected charge from the TOF pair difference signal whenever for a TOF pair a difference between the signals of the pair larger than half of the value substantially equal to one or more times the voltage corresponding to the amplitude of the injected charge is obtained and adding a value substantially equal to one or more times a voltage corresponding to the amplitude of the injected charge to the TOF pair difference signal whenever for a TOF pair a difference between the signals of the pair smaller than minus half of the value substantially equal to one or more times the voltage corresponding to the amplitude of the injected charge is obtained, and for thus providing a corrected difference signal, and wherein the signal processing system is adapted for using one or more corrected difference signals for determining time of flight of radiation.

24. The device according to claim 20, wherein the memory comprises a counter using twos complement.

* * * * *